Nov. 19, 1963 J. C. MARTIN 3,111,292
RETRACTABLE AIRCRAFT UNDERCARRIAGE
Filed Aug. 6, 1962 3 Sheets-Sheet 3
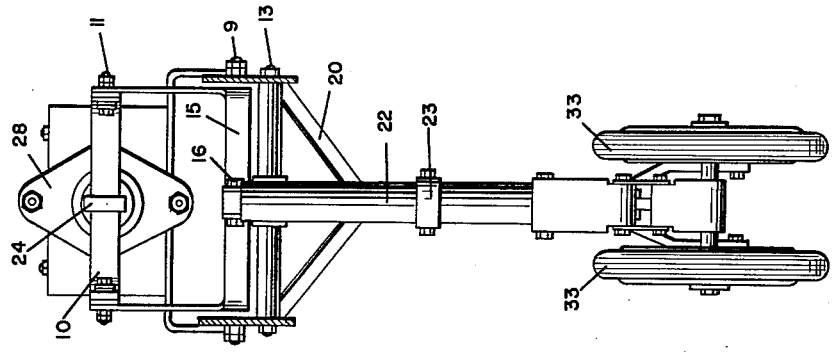
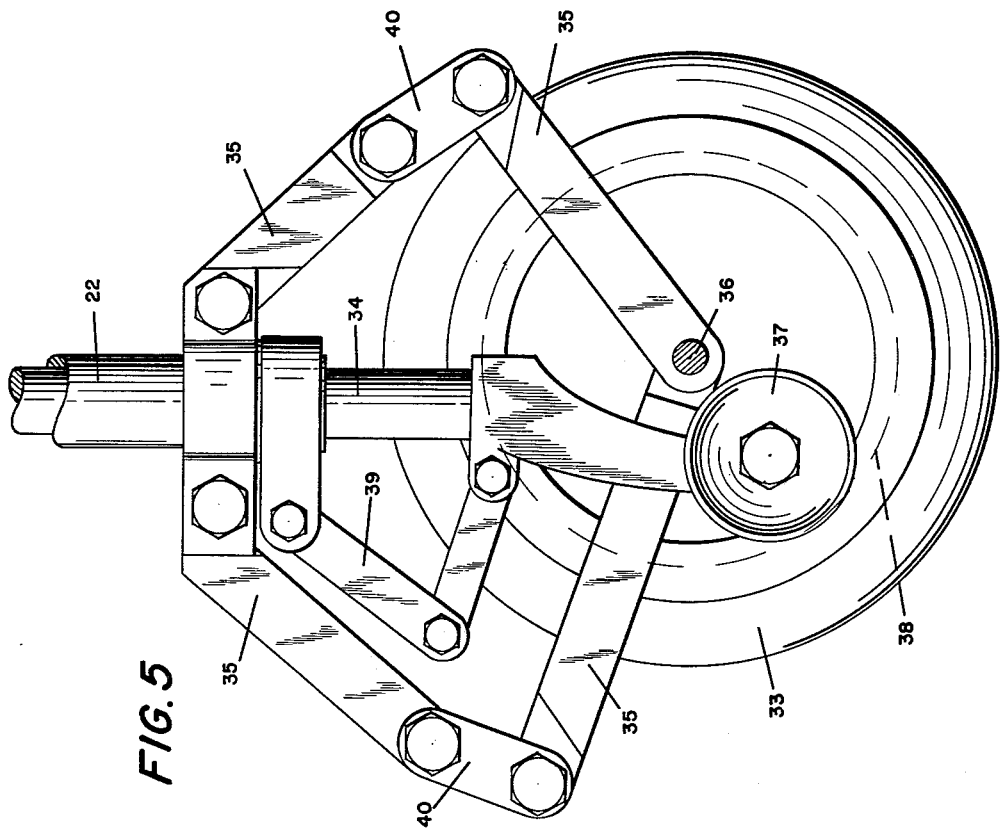
INVENTOR
JOSEPH C. MARTIN
BY *Larson and Taylor*
ATTORNEYS United States Patent Office 3,111,292
Patented Nov. 19, 1963

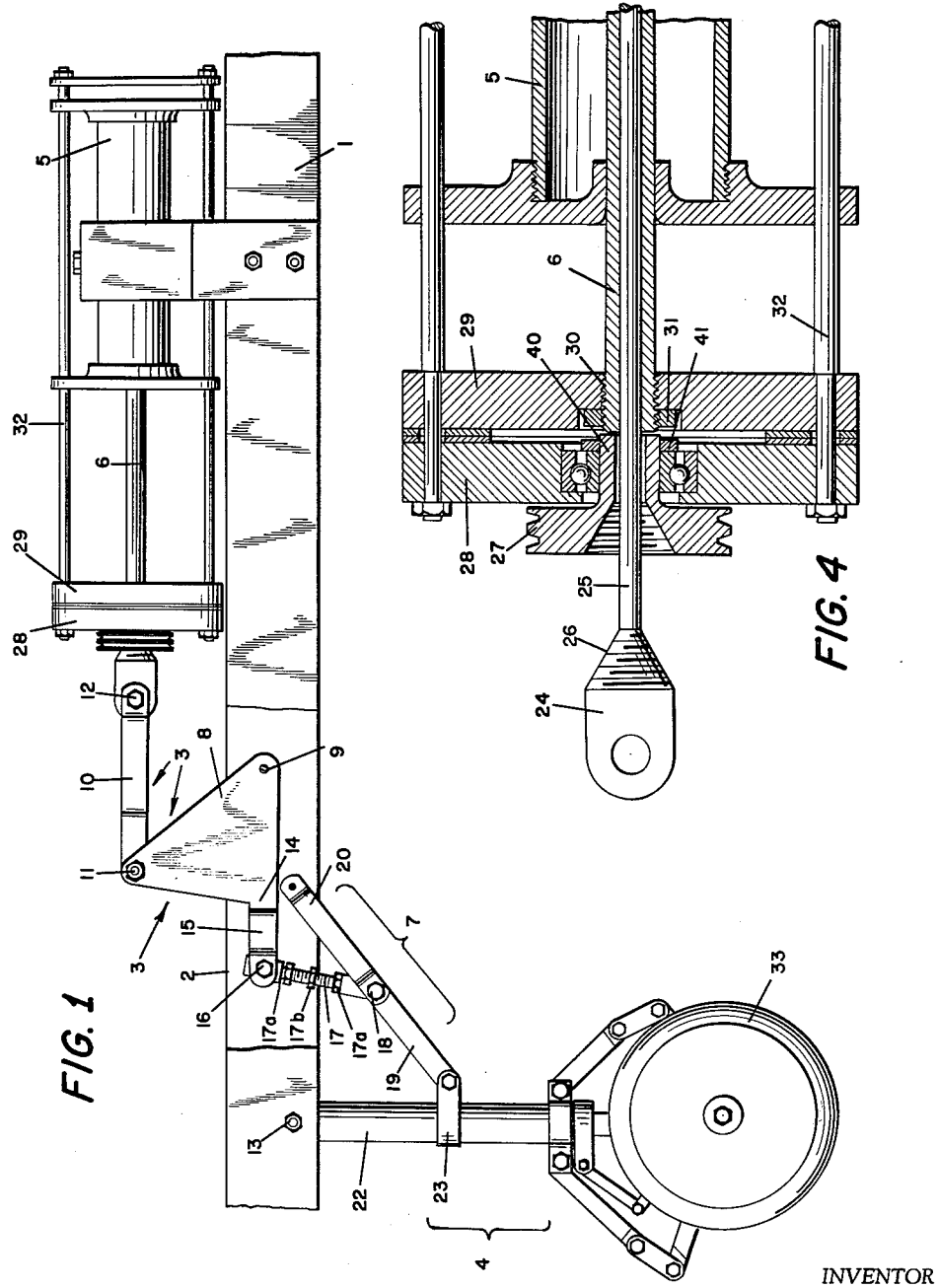

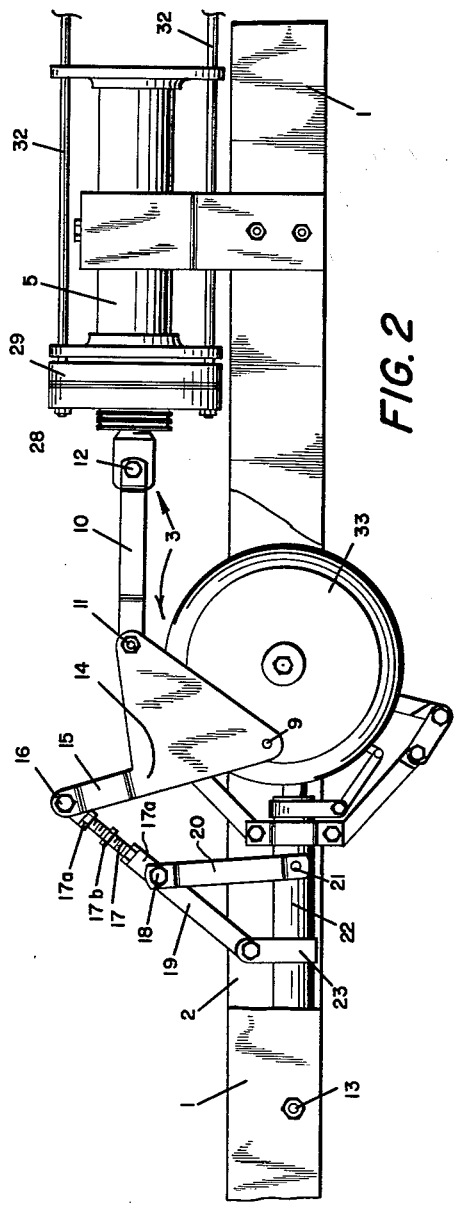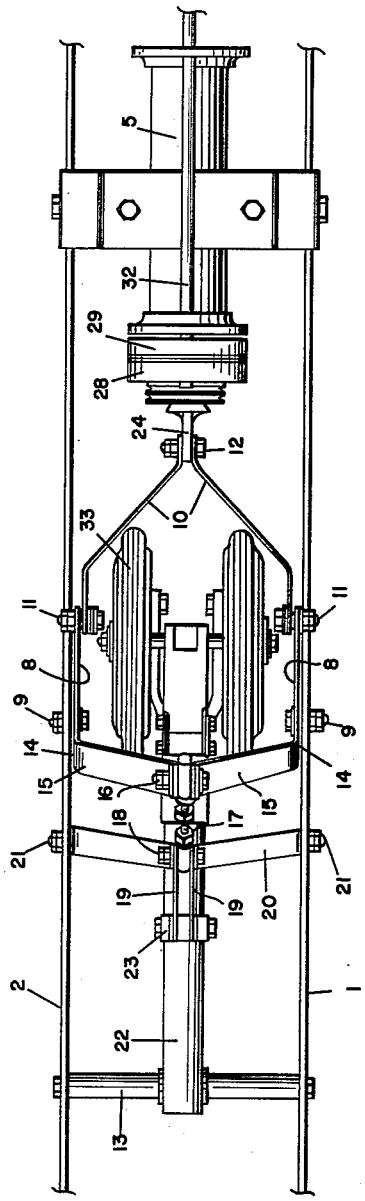

3,111,292
RETRACTABLE AIRCRAFT UNDERCARRIAGE
Joseph C. Martin, 26 Stuyvesant Place,
Staten Island 1, N.Y.
Filed Aug. 6, 1962, Ser. No. 214,921
8 Claims. (Cl. 244—102)

This invention of improvements in retractable aircraft undercarriages has for its primary object to furnish a comparatively uncomplicated and sturdy operational linkage between the actuating cylinder or other source of power and the undercarriage main shock strut assembly. The simplification rendered possible by this invention avoids the need for many pivotal joints now used in present-day operational linkage (particularly the drag-link unit, which is an intermediary mechanical element between the actuating cylinder and the drag strut which is pivotally connected to the main shock strut assembly).

A further object is to provide an operational linkage which will automatically furnish its own "down lock" when the undercarriage is lowered.

Another object is so to construct and dispose the operational linkage that it will not impede the snug reception and stowage of the undercarriage in the up position in a well of ordinary or normal dimensions of width (in the lateral direction of the craft).

A still further object is to provide an emergency quick release means whereby the undercarriage and its operational linkage can be speedily disconnected from the actuating cylinder by the pilot, and allowed to lower itself by gravity, should the hydraulic system feeding the cylinder fail, or the cylinder seize up, or other major fault occur in the mechanism or apparatus controlling the undercarriage.

According to the said invention, a retractable undercarriage for aircraft comprises a well in the aircraft structure, a main shock strut assembly pivoted to the structure in the region of the well and carrying at least one landing wheel, a power-driven motive device having a reciprocatory member for operating the undercarriage, a drag link unit pivotally mounted to the structure in the well and comprising (i) a pair of similar flat plates mounted in spaced parallel relation one on each side of the well and (ii) a two-armed yoke member having its arms pivoted together and to the reciprocatory member said arms diverging from the latter member and being terminally pivoted to said flat plates respectively, and (iii) a further pair of arms fixedly projecting one from each of said plates, directed towards each other bridging the plates and meeting at a pivotal hauling point, a drag strut disposed between, and pivoted at its ends respectively to, the said main shock strut and well structure respectively, said drag strut being a toggle-jointed element which straightens out in the lowered position of the undercarriage, and a link connecting the drag link unit at its pivotal hauling point with the drag strut at the toggle pivot thereof.

In order that the said invention may be readily understood, an embodiment thereof will be described by way of example, with the aid of the accompaying drawings wherein:

FIGURE 1 is a side elevation with part of the well-framework broken away, and with the parts in the "undercarriage down" position;

FIGURE 2 is a view similar to FIGURE 1 but with the parts in the "undercarriage up" position;

FIGURE 3 is a plan view according to FIGURE 2;

FIGURE 4 is an enlarged sectional view of an end of the hydraulic power cylinder shown on the right of the foregoing figures together with its reciprocatory ram and means for attachment to the drag link unit;

FIGURE 5 is a side view also to a larger scale of the wheel mounting of the main shock strut assembly, and FIGURE 6 is an end view looking from the left of FIGURE 1.

Like numerals of reference indicate the same or corresponding parts in the several views.

Referring to the drawings a pair of parallel horizontal frames 1, 2 represent part of the side framework structure of the undercarriage well of an aircraft, and in FIGURE 1, the drag link unit is designated generally by the numeral 3, the main shock strut assembly generally by 4, the power-driven motive device as a hydraulic cylinder 5 with reciprocatory ram 6, the drag strut generally by reference 7.

The drag link unit consists of a pair of similar flat plates 8 of triangular design which are parallel to one another and spaced apart so as to be pivoted respectively to the frames 1 and 2 of the well structure at 9, this pivotal point being at one corner of the triangle. At another corner of the triangle each plate carries one arm 10 of a two-armed yoke the arms being pivoted terminally at 11. The arms 10 are brought together at their outer ends 12 where they are pivoted together and indirectly to the ram 6. The word "indirectly" is used because, as will appear later, there is a disconnectable arrangement between the drag link unit 3 and the ram. The two arms thus splay apart divergently from the reciprocatory ram back to the flat plates 8.

The foregoing arrangement leaves practically the entire width of the well clear to receive the wheels of the main shock strut assembly 4, and twin wheels as shown can easily be accommodated in a well of ordinary dimensions. The two-armed yoke member 10, 10 operates within the well on a level well above the mouth of the well as seen clearly in FIGURES 1 and 2 giving upward clearance for the wheels, and the location of the drag link unit 3 between the pivotal axis 13 of the shock strut assembly and the reciprocatory ram enables the linkage towards the pivotal axis 13 to be folded up snugly (see FIGURES 2 and 3) within the well with plenty of room to avoid the need for narrow clearances and risk of fouling.

The plates 8 carry a further pair of arms, one on each plate which fixedly extend from the third corner of the triangle as follows. Each plate 8, at its corner 14, has an integral arm 15 and these arms project inwards of the well towards each other, forming a bridge between the plates; they are attached together by a pivot pin 16. This is conveniently termed a pivotal hauling point 16 as the pin 16 also passes through the end of a connecting link 17 which is employed for hauling up the shock strut assembly 4 by the reciprocatory ram 6 via the drag link unit 3 when the ram is retracted to make its return stroke into the cylinder 5. In this embodiment the connecting link 17 is in the form of a right and left handed screw threaded into end members 17a and held by lock nuts, there being a central integral nut-like body 17b for adjusting the effective length of the link.

The drag strut 7 is made as a toggle link by pivoting together at 18 the two component links 19 and 20. The link 20 is pivoted at 21 to the well-framework and the link 19 to the upper part 22 of the main shock strut 4 through the medium of the clamping band 23. As previously mentioned the main shock strut 4 is pivoted to the well-frame at 13 so that it can swing up from the down position in FIGURES 1 and 6 towards the cylinder 5 into the up position according to FIGURES 2 and 3. By reference to the plan view FIGURE 3, it will be seen that the upper link 20 of the drag strut 7 is a composite member having two similar links (right and left hand) which start from the pivot 18 and open out so as respectively to be secured by pivots 21 to the opposite frame members 1 and 2. The lower link 19 of the drag strut 7 is shown as a similar composite member made up of two straight links 19 which to all intents and purposes compose one link, and by reference to FIGURE 3 particularly it will be clear that this lower link 19 could be a single solid link. The hereinbefore mentioned connecting link 17 which is connected pivotally at 16 to the drag link unit 3 is connected by its lower end to the pivot 18 of the drag strut 7. The latter acts as a toggle which breaks at the pivot 18 when pulled up by the drag link unit 3 as will be seen in FIGURE 2 and straightens out in the lowered position of the undercarriage as seen in FIGURE 1. This provides a sure down-lock holding the main shock strut 4 solidly in position until such time as the undercarriage is drawn up, whereupon the connecting link 17 breaks the toggle as previously indicated allowing the main shock strut 4 to pivot freely on its pivotal axis 13. The connecting link 17 can be adjusted as to length.

The drag link unit 3 through the two-armed yoke member 10, 10 is pivoted to the ram 6 in a readily disconnectable manner as follows. The pivot at point 12 is carried through a connector 24 (see particularly FIGURE 4) which is on the end of a shaft 25 freely slidable in the axial direction within the ram 6 which is hollow for such a purpose. The connector 24 is threaded at 26 and normally screwed within a freely rotatable pulley 27 and as the pulley 27 moves axially with the ram 6, as will appear later, the normal operation is that the connector 24 follows the reciprocatory movements of the ram 6. The pulley 27 is rotatable within a bridge piece 28, with the interposition of suitable bearings, by the hub portion 40 held by lock nut 41. This bridge piece 28 is solidly connected to a second bridge piece 29 to which the ram 6 is immovably connected as by the threaded end 30 and lock nut 31. In FIGURE 4 the connector is shown disconnected from the pulley 27 but, as already mentioned, in the normal position of working these two elements are screwed together and thus reciprocation of the ram 6 will move the bridge elements 28, 29 and thus will move the connector and operate the drag link unit 3 so as to raise and lower the undercarriage, i.e. the main shock strut assembly 4.

The pulley 27 is rotatable through the agency of any suitable cable device passing around the pulley and led back via any appropriate and necessary guides and idle pulleys to an operational position in the pilot's cockpit or cabin. By this means the pulley 27 can be rotated from a remote position and in so doing will unscrew the connector from the pulley. This will immediately free the undercarriage from the hydraulic system allowing it to descend by gravity when the usual up-lock has been released. In such a case the shaft 25 slides out of the ram 6, and any suitable locking or clutch device may be incorporated with the pulley to hold the shaft in the retracted position and thus to provide a second down lock augmenting the toggle action of the drag strut 7. A locking clutch of the kind including a pair of serrated edge pivoted cams opposed to one another on diametrically opposite sides of the shaft 25 in one form of locking device applicable for the purpose. By the use of such a remote controlled mechanical quick release, if the hydraulic system fails, or the ram seizes up in its cylinder, the pilot, in such an emergency, can cause the cable to be moved and rotate the pulley 27 so as to free the undercarriage and allow it to lower itself by gravity. The screw connection at 26 is advantageously of conical form, i.e. a conical screw 26 and a complemental internally threaded recess in the pulley 27 as depicted in FIGURE 4 which allows for a very quick disconnection with the minimum of rotation of the pulley 27.

It will be noted that the so-called bridge elements 28, 29 are connected together by the respective ends of two slide rods 32 which have reduced diameters passing through the said bridge elements and locked by a nut on the exterior. These slide rods reciprocate in unison with the ram 6, and the members 28, 29 which bridge the slide rods 32 naturally move in accordance with the ram 6.

The main shock strut assembly 4 of the undercarriage terminates in a ground wheel. In the embodiment a twin ground wheel is included in the undercarriage assembly—see the wheels 33 particularly as shown in FIGURE 5, and the coaxial twin wheels mounted on a common axle will be clearly seen in the plan view of FIGURE 3. In present day constructions the ground wheels 33 are mounted on the interior telescopic member 34 of the main shock strut assembly 22—34. The input of landing is taken up by this telescopic arrangement in which usually an aerated oil buffer is employed in the cylinder 22. This arrangement forms no part of the present invention and can really be any resilient telescopic buffer found suitable. In the present invention however it is considered very useful, in conjunction with the operational mechanism previously described, to introduce a novel mounting of the ground wheels 33 on the main shock strut. In this respect FIGURE 5 shows one of the twin wheels 33 removed for clearness, and the ground wheels 33 are pivoted on a common axle carried by a scissors arrangement 35 of which some links pivot from the wheel axis and others from pivots on the outside cylinder 22 of the main strut, but there is the difference that the load of the craft which is conveyed through the inner cylinder 34 of the strut is not applied directly to the axle 36 of the ground wheels 33. The latter as usual may rise and fall with respect to the outer member 22 of the shock strut but otherwise they merely float. The actual weight of the aircraft and the gravitational landing and shock forces are applied through the inner cylinder 34 of the shock strut to a loading wheel 37 for each ground wheel 33 which runs on an annular surface 38 in the rim of the respective ground wheel 33. The inner ram 34 of the shock strut is controlled by a secondary scissors linkage 39 as seen in FIGURE 5. By this arrangement when the aircraft is travelling forwardly in the direction of arrow A in FIGURE 5, the loading wheel 37 which presses on the annular surface 38 of the ground wheel tends to ride up in the direction of the arrow A and assist very materially the ground wheel lifting and riding over obstacles in the course of its journey. This result is particularly obtainable when the ground wheel 37, normally—with only slight load on the ground—is offset forwardly from the vertical axis of the shock absorbing strut arrangement 22—34. The usual scissors linkage 35 is modified by the interposition of short extra links 40.

I claim:

1. A retractable undercarriage for aircraft comprising a well in the aircraft structure, a main shock strut assembly pivoted to the structure in the region of the well and carrying at least one landing wheel, a power-driven motive device having a reciprocatory member for operating the undercarriage, a drag link unit pivotally mounted to the structure in the well and comprising (i) a pair of similar flat plates mounted in spaced parallel relation one on each side of the well and pivoted to the well at corresponding points so as to define an open space therebetween, and (ii) a two-armed yoke member having its arms pivoted together and to the reciprocatory member, said arms diverging from the latter member and being terminally pivoted to said flat plates respectively, at corresponding points spaced from the pivot points of said flat plates and (iii) a further pair of arms fixedly projecting one from each of said plates, directed towards each other bridging the plates and meeting at a pivotal hauling point, a drag strut disposed between and pivoted at its ends to the said main shock strut and well structure respectively, said drag strut being a toggle-jointed element which straightens out in the lowered position of the undercarriage, the end of said drag strut which is pivoted to said well structure comprising a pair of arms pivoted to respective sides of said well structure at one of their ends and diverging towards each other at the other of said ends to pivotally connect with the other element of the toggle joint, and a link connecting the drag link unit at its pivotal hauling point with the drag strut at the toggle pivot thereof, whereby said main shock strut assembly and said wheel can be easily and quickly retracted into said well without interference from said linkages or said pivots because of the mechanical advantage created by the combined linkages.

2. A retractable undercarriage according to claim 1 in which the power driven motive device is a hydraulic cylinder with its ram as the reciprocatory member, and the cylinder is so disposed in relation to the drag link unit that its ram is retracted so as to pull on the drag link unit when the undercarriage is to be lifted.

3. A retractable undercarriage according to claim 1 in which the link connecting the drag link unit with the drag strut is a right and left handed screw threaded into end members and held by lock nuts, and a central integral nut-like body is formed on said screw for adjusting the effective length of said link.

4. A retractable undercarriage according to claim 1 in which the pivotal hauling point of the two-armed yoke member of the drag link unit is connected to the reciprocatory member in detachable manner in combination with means for detaching said connection from a remote location.

5. A retractable undercarriage according to claim 1 in which the pivotal hauling point of the two-armed yoke member of the drag link unit is connected to the reciprocatory member in detachable manner in combination with means for detaching said connection from a remote location, and the power driven motive device is a hydraulic cylinder with its ram as the reciprocatory member, and the cylinder is so disposed in relation to the drag link unit that its ram is retracted so as to pull on the drag link unit when the undercarriage is to be lifted, the said ram being hollow and containing a shaft axially slidable therein and exteriorly terminating in a screw-threaded end which is screwed into a cable-operated pulley axially fixed in relation to the ram, said pulley, by its rotation constituting means for detaching said connection from the ram, the shaft which is slidable in the hollow ram terminating in a conical end which is screw-threaded into a complemental internally conical axial recess in the pulley whereby a quick disconnection between said shaft and pulley can be made with a minimum of turns of the pulley, said pulley being rotatably mounted in a bridge piece connected to a corresponding bridge piece fixedly mounted on the end of the hollow ram, both bridge pieces being mounted on the cylinder so as to be slidable thereon in the axial direction thereof and with the ram.

6. A retractable undercarriage according to claim 1 in which the undercarriage includes twin ground wheels on a common axle mounted on the main shock strut assembly, the latter including inside and outside telescopic cylinders, said axle being mounted on the outside telescopic cylinder by a scissors arrangement of linkage of which some links pivot from the axis of the wheel axle and others from the outside cylinder, and a pair of loading wheels connected to the inside telescopic cylinder and running on respective annular surfaces in the rims of the ground wheels.

7. A retractable undercarriage for aircraft, comprising: a well in the aircraft structure; a main shock strut assembly pivoted to the structure in the region of the well and carrying at least one landing wheel; a power driven motive device having a reciprocatory member for operating the undercarriage; a drag link unit pivotally mounted to the structure in the well and comprising (i) a pair of similar flat plates mounted in spaced parallel relation one on each side of the well and pivoted to the well at corresponding points, and (ii) a yoke member pivotally connected at one end to the reciprocatory member and at the other end being pivotally connected to said flat plates, and (iii) a pair of arms fixedly projecting one from each of said plates, directed towards each other bridging the plates and meeting at a pivotal hauling point; a drag strut disposed between and pivoted at its ends to the said main shock strut and well structure, respectively, said drag strut being a toggle-jointed element which straightens out in the lowered position of the undercarriage; a link connecting the drag link unit at its piovtal hauling point with the drag strut at the toggle pivot thereof; and means for detaching the connection between said yoke member and said reciprocatory member so as to permit the main shock strut assembly to move to the down position by gravity, said means comprising a shaft connected to said yoke member and axially slidable in a hollow portion of said reciprocatory member, said axially slidable shaft having a screw threaded portion, said reciprocatory member having a corresponding screw threaded portion for engaging the screw threaded portion of said axially slidable shaft, and means for permitting at least one of said screw threaded portions to be rotated so as to engage or disengage said axially slidable shaft relative to said reciprocatory member, whereby said yoke member and said axially slidable shaft to which said yoke member is connected can be disengaged from said reciprocatory member so as to permit said main shock strut assembly to move to the down position freely by gravity.

8. A retractable undercarriage according to claim 7 wherein said screw threaded portion of said reciprocatory member comprises a pulley rotatably mounted on said reciprocatory member and having a conical screw-threaded recess aligned with the hollow portion of said reciprocatory member in which said axially slidable shaft is slidably mounted, the screw threaded portion of said axially slidable shaft comprising a corresponding conical screw-threaded portion for moving axially into and out of engagement with the conical screw-threaded pulley, whereby said axially slidable shaft can be connected to or disconnected from said pulley and said reciprocatory member with a minimum of turns of the pulley.

References Cited in the file of this patent

UNITED STATES PATENTS

| 1,866,652 | Isacson et al. | July 12, 1932 |
| 2,559,451 | McBrearty | July 3, 1951 |
| 2,903,206 | Rominger | Sept. 8, 1959 |

FOREIGN PATENTS

| 458,187 | Great Britain | Dec. 15, 1936 |